April 2, 1940.  E. H. JOHNSON  2,195,518
GRAIN DIVIDER
Filed Oct. 18, 1937  2 Sheets-Sheet 1
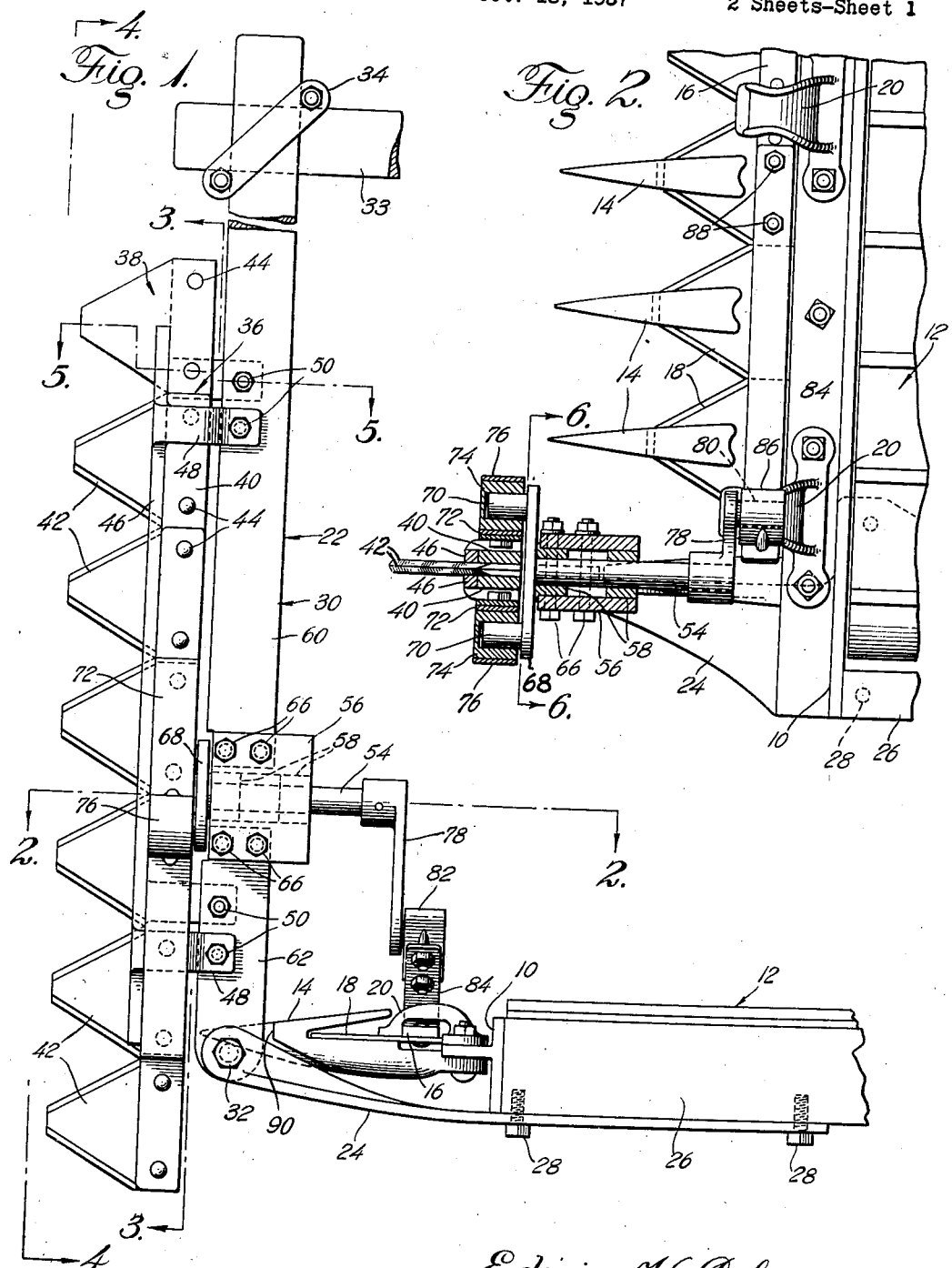
Edwin H. Johnson.
INVENTOR
BY Victor J. Evans & Co.
HIS ATTORNEYS

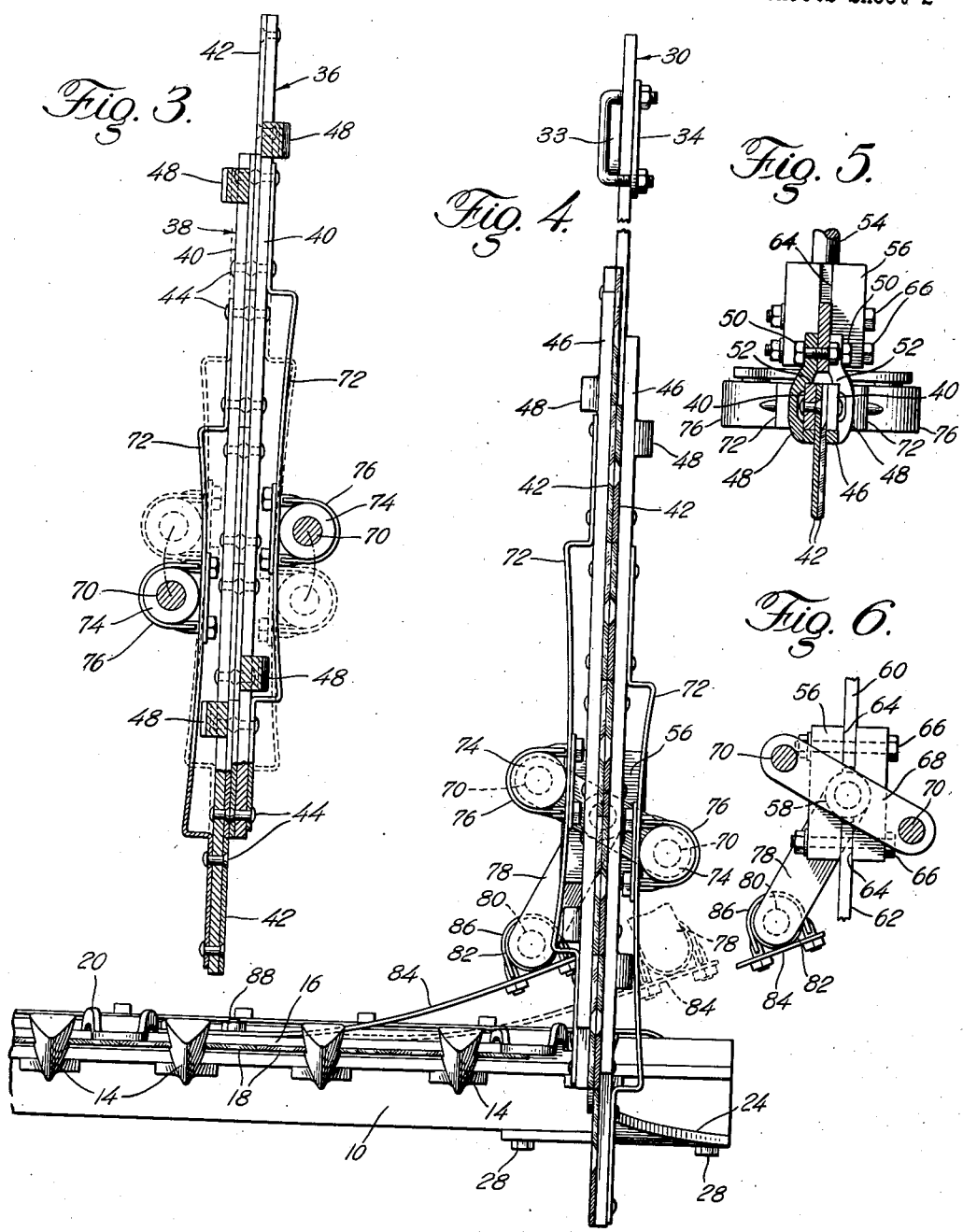

Patented Apr. 2, 1940

2,195,518

UNITED STATES PATENT OFFICE 2,195,518

GRAIN DIVIDER

Edwin H. Johnson, Lincoln, Ill.

Application October 18, 1937, Serial No. 169,709

7 Claims. (Cl. 56—316)

My invention relates to agricultural machines, such as combines, binders, reapers, mowers, and the like, and includes among its objects and advantages the provision of an improved vertical divider.

Present day equipment, such as combines and grain binders, perform efficiently in clean and straight grain. It frequently happens that large patches in a field of grain become lodged and tangled to such a degree as to impair the efficiency of the cutting machine. A heavy growth of weeds is also an obstruction. The machines while making an efficient cut fail at times to pick up the grain at the grain wheel end of the cutting knife because of the tangled relation of the cut grain with the uncut grain. At times the tangled mass will pull cut grain off the platform canvas while at other times the tangled grain will be pulled into the reel. The cut grain should separate easily and cleanly from the standing grain, otherwise a ragged swath will be made with the result that the machine will run over much of the cut grain which has been pulled back onto the field and cause considerable damage thereto. To expedite cutting of the grain and to handle the cut grain with a minimum loss, the machine must cut a clean swath.

An object of my invention is to provide a vertical divider so designed as to be easily and quickly connected with conventional cutting bars and in which the vertical divider is so constructed as to cleanly divide the cut grain from the standing grain on the field. The divider is so constructed and arranged as to be easily and quickly operatively connected with the cutting knife by a simple connection.

In the accompanying drawings:

Fig. 1 is an end view of a conventional cutting knife and canvas platform such as are used in grain binders and combines;

Fig. 2 is a sectional view along the line 2—2 of Fig. 1;

Fig. 3 is a sectional view along the line 3—3 of Fig. 1;

Fig. 4 is a view taken from the position indicated by line 4—4 of Fig. 1;

Fig. 5 is a sectional view along the line 5—5 of Fig. 1; and

Fig. 6 is a sectional view along the line 6—6 of Fig. 2.

In the embodiment selected to illustrate my invention I make use of a sill bar 10 which comprises a part of the canvas platform 12, both of which are of conventional structure. Sill bar 10 carries a plurality of conventional guards 14 while the guards support the knife bar 16 which carries the cutting knives 18. Bar 16 and the knives 18 are connected as a unit in the usual way and travel in a reciprocatory path through the medium of a pitman, not shown, but which is well known in the art. The usual pressure elements 20 are connected with the knife assembly for holding the knife in proper seeding relation with the guards 14.

Figs. 1, 2 and 4 illustrate the grain end of the cutting knife and the canvas platform 12. To this end of the canvas platform I mount a vertical divider 22 through the medium of a bracket 24 which extends underneath the frame member 26 of the canvas platform and is fixedly connected thereto by bolts 28. Grain divider 22 comprises an upright bar 30 bolted at 32 to the forward end of the bracket 24. The upper end of the bar 30 may be braced by a bar 33 having one end connected to the bar 30 by a clamp 34 and its opposite end extended back to and connected with the reel support, not shown. Such reel supports are well known in the art and need not be described in detail. Adjacent the forward edge of the bar 30 I mount two blade units 36 and 38 best illustrated in Figs. 3 and 4. Each blade unit comprises a bar 40, to each of which a plurality of knives 42 is connected by rivets 44. Knives 42 are of the same type as the knives 18. The knives 42 of one unit lie in pressure relation with the knives 42 of the other unit. The guide bar 46 lies adjacent the forward edge of each of the bars 40 and in pressure relation with the blades 42. In Figs. 1 and 5, I illustrate the bars 46 as being provided with straps 48 extending back across the bars 40 and fixedly connected with the bar 30 by bolts 50. Each of the straps 48 includes a shoulder 52 which abuts the rear edge of one of the bars 40. Thus, bars 40 are slidably related for longitudinal movement but are restrained from lateral movement.

Means for reciprocating the knife units 36 and 38 comprises a shaft 54 rotatably carried by a bearing block 56 which may be provided with conventional roller bearings, as indicated generally at 58. Bar 30 is preferably made up of sections 60 and 62 which have their lower and upper ends, respectively, positioned in slots 64 in the bearing block 56 and fixedly connected thereto by bolts 66. To the forward end of the shaft 54 I fixedly connect a cross bar 68. Shaft 54 is located intermediate the ends of the cross bar 68, and the latter carries a bearing pin 70 at each end at equal distances from the axis of the shaft 54. Each bar 40 carries a U-shaped member 72 which is fixedly connected thereto by several of the rivets 44 which connect the knives 42 with their respective bars. Members 72 are of resilient material, and each member carries a bearing 74 fixedly secured thereto by a clamp 76. Bearing 74 may be of the ball type, and each bearing is connected with one of the pins 70. Pins 70 are spaced at such distances as to place the member 72 under slight flexure, as illustrated in Fig. 3. Thus, the cutting knives 36 and 38 are held in pressure relation. A crank 78 is fixedly connected with the rear end of the shaft 54, and its lower end is provided with a pin 80 connected with a bearing 82 secured to a pitman 84 by a clamp 86. Pitman 84 comprises a resilient strap having its opposite end fixedly connected to the knife bar 16 by bolts 88.

From the foregoing description of the various parts of the device the operation thereof will be readily understood. Movement of the cutting bar of the machine imparts oscillatory movement of the crank 78 backward and forward, as represented by the full and dotted line positions of Fig. 4. Such oscillatory movement of the crank shaft 78 oscillates the shaft 54 in the same manner, which, in turn, operates the cross bar 68 for operating the cutting units 36 and 38. These cutting units are moved simultaneously in opposite directions. Since the vertical divided is located at the grain wheel end of the canvas platform 12, the cutting units 36 and 38 will cut all tangled and lodged grain and weeds in such a manner that all the cut grain will be delivered to the canvas platform. The cutting units 36 and 38 are positioned sufficiently low to sever the tangled grain vertically to a depth below the cutting knife of the machine. At the same time, the cutting knife of the machine cuts the grain horizontally up to the position of the vertical line of severance so that all the grain will be completely cut. Because of the resilient member 72, the cutting units 36 and 38 are maintained under the necessary pressure at all times, and the resilient nature of the members compensates wear. While the members 72 are flexed in various degrees during the oscillation of the cross bar 68, yet the members are originally placed under sufficient flexure to impart pressure to the cutting units 36 and 38 at all times as well as to compensate wear. The guard 14 adjacent the grain wheel and of the canvas platform 12 is cut off at 90 to accommodate the bar 30 (see Fig. 1). Thus, the vertical divider may be located in close relation with the horizontal cutting knife, and the vertical cut is directly in line with the last guard so as to leave no uncut grain.

Without further elaboration, the foregoing will so fully explain my invention that others may, by applying current knowledge, readily adapt the same for use under various conditions of service.

I claim:

1. A vertical divider for mowing machines including a guard bar and a cutting knife operatively related thereto, said vertical divider comprising a pair of cutters, guide means for the cutters carried by the guard bar, bowed resilient straps connected with the cutters, a link having its ends journaled to said bowed resilient straps, and a crank connected with said link for connection with said cutting knife, to reciprocate the cutters simultaneously in opposite directions, said link being of such length as to flex the bowed resilient straps, to hold the cutters in pressure relation with respect to each other.

2. In a mowing machine having a reciprocatory cutting knife, a vertical divider comprising two cutters arranged face to face for simultaneous reciprocation in opposite directions, an upright support having guide means for the two cutters, a crank journaled for oscillation on said support intermediate the ends of the two cutters and operatively connected with the cutting knife, said crank having bar means extending transversely of the two cutters in the rear thereof, and means for operatively connecting said bar means with the two cutters.

3. In a mowing machine having a reciprocatory cutting knife, a vertical divider comprising two cutters arranged face to face for simultaneous reciprocation in opposite directions, an upright support having guide means for the two cutters, a crank journaled for oscillation on said support intermediate the ends of the two cutters and operatively connected with the cutting knife, said crank having bar means extending transversely of the two cutters in the rear thereof, and resilient means connected with said bar means to be tensioned thereby for pressing the two cutters together and for operatively connecting the two cutters with the bar means.

4. In a mowing machine having a reciprocatory cutting knife, a vertical divided comprising two cutters arranged face to face, an upright support having guide means for the two cutters, a crank journaled for oscillation on said support intermediate the ends of the two cutters, a flexible pitman having one end loosely connected with the crank and its other end fixedly connected with the cutting knife, and means for operatively connecting said crank with the two cutters.

5. In a mowing machine having a reciprocatory cutting knife, a vertical divider comprising two cutters arranged face to face for simultaneous reciprocation in opposite directions, an upright support having guide means for the two cutters, a crank journaled for oscillation on said support intermediate the ends of the two cutters and operatively connected with the cutting knife, said crank having bar means extending transversely of the two cutters in the rear thereof, and a yielding connection between said bar means and the two cutters.

6. In a mowing machine having a reciprocatory cutting knife, a vertical divider comprising cutter means, an upright guide for the cutter means, a crank journaled on said upright guide for oscillation about a horizontal axis located inwardly of the ends of the cutter means, a pitman connection between said crank and the cutting knife, a cross bar fixedly related to the crank in the rear of the cutter means and extending transversely thereof, and yielding means operatively connecting the cross bar with said cutter means.

7. In a mowing machine having a reciprocatory cutting knife, a vertical divider comprising two cutters arranged face to face, an upright support having guide means for the two cutters, a crank journaled for oscillation about a horizontal axis located transversely of the two cutters intermediate their ends, a cross bar on said crank extending transversely of the two cutters, pivots at the ends of said bar located laterally of said cutters, a bearing for each of said pilots, and means for connecting the bearings with said cutters permitting the bearings to move toward and from said cutters with the latter constrained face to face.

EDWIN H. JOHNSON.